June 5, 1923.

E. E. CLEVELAND

TREE HOLDING STAND

Filed Jan. 10, 1922

1,457,820

ERNEST E. CLEVELAND
INVENTOR

BY

ATTORNEY

Patented June 5, 1923.

1,457,820

UNITED STATES PATENT OFFICE.

ERNEST E. CLEVELAND, OF SPRINGFIELD, MASSACHUSETTS.

TREE-HOLDING STAND.

Application filed January 10, 1922. Serial No. 528,325.

*To all whom it may concern:*

Be it known that I, ERNEST E. CLEVELAND, a citizen of United States, residing at Springfield, in the county of Hampden, State of Massachusetts, have invented certain new and useful Improvements in Tree-Holding Stands; and I do hereby declare the following to be a full, clear, and exact description of the invention, such as will enable others skilled in the art to which it appertains to make and use the same.

This invention relates to new and useful improvements in stands, and particularly to stands for use in supporting Christmas trees.

One object of the invention is to provide a tree holding stand which is formed of few and simple parts and which will cooperate to grip the bases of Christmas trees of different diameters.

Another object of the invention is to provide a devise of this character which is easy to operate, strong and durable in construction, and which can be manufactured at a low cost.

Other objects will be apparent from the following description when taken in connection with the drawing.

Figure 1:
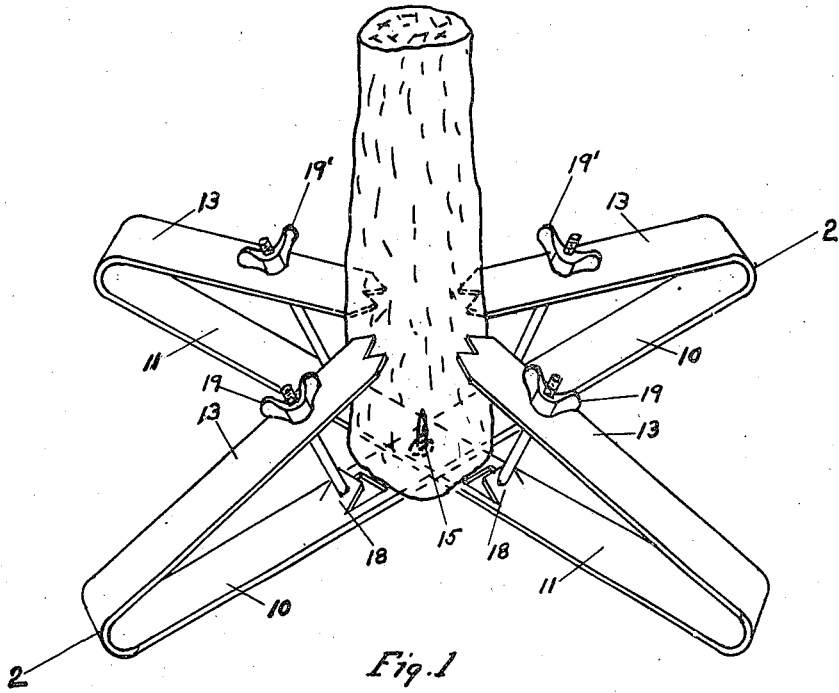
Figure 1 is a perspective view of the holder, a portion of the base of the Christmas tree being shown in position therein.
Figure 2:
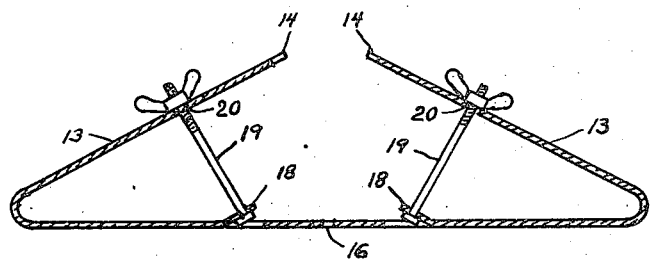
Figure 2 is a section on the line 2—2 of Figure 1 showing the bolts in elevation.

Referring particularly to the accompanying drawing, the stand is formed from two narrow strips of metal 10 and 11, disposed in crossed relation. The opposite ends of each of the members 10 and 11, are bent to extend at an inclination upwardly and inwardly toward the center of the device, as shown at 13, said ends being provided with the tree penetrating points 14. A nail or screw 15 is passed upwardly through the openings 16 in the intermediate portions of the members 10 and 11 and is driven into the bottom of the tree trunk.

Struck up from each of the members 10 and 11, adjacent its central portion and on each side thereof, is an apertured wing 18, the aperture being preferably circular to receive the shank of the bolt 19, which is passed upwardly through the opening, formed by striking upwardly the wing, and then through the opening 20 in the portion 13 at a suitable distance from the point thereof. A winged nut 19', is engaged on the bolt above the portion 13, so that upon turning downwardly on the nut the portions 13 will be flexed downwardly to bring their points 14 into firm biting relation with the tree trunk. The head of each bolt 19 is preferably square and properly fits within the opening made by the lugs 18, with the result that the bolts will be prevented from turning. The four members 13, being of equal length, will bite into the tree trunk at four diametrically opposite points, with the result that the tree will be firmly held, and properly centered on the stand. The nail or screw holds the base of the tree against lateral movement while the members 13 prevent tilting of the tree. When the nail or screw is driven up into the base of the tree trunk the intermediate portions of the members 10 and 11 will be lifted above the plane of the outer bight portions of the members, whereby the said bight portions, only, will rest on the floor.

The floor engaging portions of the members 10 and 11 are of sufficient length to form an efficient base for the tree.

What is claimed is.

A Christmas tree holder comprising a pair of crossed members each formed from a single length of material and each bent on itself at its opposite ends to produce a pair of resilient arms, said arms extending upwardly and inwardly toward the center of the intersection of the members, said ends being provided with longitudinally extending terminal tree penetrating points, struck up lugs formed on the cross members, and clamping bolts disposed through the lugs and flexible arms for operation to flex the arms into biting engagement with a tree trunk.

In testimony whereof, I affix my signature, in the presence of two witnesses.

ERNEST E. CLEVELAND.

Witnesses:
FRANK C. HINCKLEY,
GEO. E. RICHARDSON.